(12) United States Patent
Sato et al.

(10) Patent No.: US 10,589,760 B2
(45) Date of Patent: Mar. 17, 2020

(54) BRANCHING UNIT AND VEHICULAR SYSTEM

(71) Applicant: Hitachi Industrial Equipment Systems Co., Ltd., Chiyoda-ku, Tokyo (JP)

(72) Inventors: Takashi Sato, Tokyo (JP); Kenji Tsuchiya, Tokyo (JP); Masato Yabu, Tokyo (JP); Makoto Watanabe, Tokyo (JP); Yoshinori Shimada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/098,180

(22) PCT Filed: Jan. 18, 2017

(86) PCT No.: PCT/JP2017/001445
§ 371 (c)(1),
(2) Date: Nov. 1, 2018

(87) PCT Pub. No.: WO2017/199465
PCT Pub. Date: Nov. 23, 2017

(65) Prior Publication Data
US 2019/0144012 A1    May 16, 2019

(30) Foreign Application Priority Data
May 16, 2016   (JP) .................................. 2016-097571

(51) Int. Cl.
*B61G 5/10* (2006.01)
*B60L 5/00* (2006.01)
(Continued)

(52) U.S. Cl.
CPC ................. *B61G 5/10* (2013.01); *B60L 5/00* (2013.01); *B60L 15/00* (2013.01); *B60L 15/002* (2013.01);
(Continued)

(58) Field of Classification Search
CPC ... B61G 5/10; B60L 5/00; B60L 15/00; B60L 15/002; H01H 33/662; H01H 33/666; H01H 33/66
See application file for complete search history.

(56) References Cited

U.S. PATENT DOCUMENTS

| 2001/0004067 A1 | 6/2001 | Kikukawa et al. |
| 2011/0036811 A1 | 2/2011 | Utsumi et al. |
| 2014/0008169 A1* | 1/2014 | Kawasaki ................ B61G 5/10 |
| | | 191/59.1 |

FOREIGN PATENT DOCUMENTS

| EP | 1 863 138 A2 | 12/2007 |
| JP | 2001-176364 A | 6/2001 |

(Continued)

OTHER PUBLICATIONS

International Search Report (PCT/ISA/210) issued in PCT Application No. PCT/JP2017/001445 dated May 16, 2017 with English translation (four (4) pages).
(Continued)

*Primary Examiner* — Carlos Amaya
(74) *Attorney, Agent, or Firm* — Crowell & Moring LLP

(57) ABSTRACT

The present invention provides a branching unit, the height of which can be reduced, and a vehicular system. The branching unit includes a switch equipped with a fixed electrode and a movable electrode; a first bushing conductor which is connected either to the fixed electrode or to the movable electrode; and a second bushing conductor which is connected to the other of the fixed electrode and the movable electrode. A first T-shaped cable head is connected at one end to the first bushing conductor, a second T-shaped cable head is connected to a different end part of the first T-shaped cable head from the one end, a third T-shaped cable head is connected at one end to the second bushing conductor, the first T-shaped cable head and the second T-shaped cable head are respectively connected to different circuits, and surfaces of the respective T-shaped cable heads and the switch are at a ground potential.

6 Claims, 5 Drawing Sheets

(51) Int. Cl.
    *H01H 33/662* (2006.01)
    *B60L 15/00* (2006.01)
    *H01H 33/666* (2006.01)
    *H01H 33/66* (2006.01)

(52) U.S. Cl.
    CPC ........ *H01H 33/662* (2013.01); *H01H 33/666* (2013.01); *H01H 33/66* (2013.01)

(56) References Cited

FOREIGN PATENT DOCUMENTS

| | | |
|---|---|---|
| JP | 2001-210200 A | 8/2001 |
| JP | 2011-41407 A | 2/2011 |
| JP | 2012-39872 A | 2/2012 |
| JP | 2015-222617 A | 12/2015 |
| WO | WO 2012/095895 A1 | 7/2012 |

OTHER PUBLICATIONS

Japanese-language Written Opinion (PCT/ISA/237) issued in PCT Application No. PCT/JP2017/001445 dated May 16, 2017 (five (5) pages).
Extended European Search Report issued in counterpart European Application No. 17798904.3 dated Dec. 5, 2019 (eight (8) pages).

\* cited by examiner

BRANCHING UNIT AND VEHICULAR SYSTEM

TECHNICAL FIELD

The present invention relates to a branching unit and a vehicular system.

BACKGROUND ART

In many cases, a related-art branching unit for high-voltage drawing-in cables, which is to be mounted to a railroad vehicle or the like, does not have a switching function. In a case of the branching unit without the switching function, a crew is required to manually disconnect a circuit when a ground fault occurs to any of the high-voltage drawing-in cables. This needs a lot of labor. As an improvement measure, for example, there is described a branching unit having the switching function in Patent Literature 1.

The switching device includes a power collector, a circuit breaker unit, and a plurality of power cables. The power collector collects power from an overhead line. The circuit breaker unit is connected to the power collector and installed on a roof of a vehicle. The plurality of power cables are connected to the circuit breaker unit. The circuit breaker unit includes a circuit breaker and branching joints. The circuit breaker is arranged on the roof and is connected to the power collector. The branching joints are arranged under the circuit breaker while being integrally connected to terminal portions of the circuit breaker. The plurality of power cables are connected to the branching joints. In such configuration, the branching joints have eight bushings. A high-voltage cable having a T-shaped cable head is connected to each of four bushings among the eight bushings.

CITATION LIST

Patent Literature

PATENT LITERATURE 1: WO 2012/98595

SUMMARY OF INVENTION

Technical Problem

In Patent Literature 1, the terminal portions of the circuit breaker are exposed in an air insulation state. The terminal portions being parts of a current circuit have a high voltage. For safety reasons, the roof of the vehicle is set to a ground potential. Thus, it is required to separate the terminal portions and the roof of the vehicle from each other. Meanwhile, due to a limitation of a space, it is preferred that the branching unit arranged on the roof of the railroad vehicle or the like be reduced particularly in height.

In view of the circumstance, the present invention has an object to provide a branching unit, which can be reduced in height, and a vehicular system.

Solution to Problem

In order to achieve the above-mentioned object, according to one embodiment of the present invention, there is provided a branching unit, including: a first T-shaped cable head; a second T-shaped cable head; a third T-shaped cable head; a switch including a fixed electrode and a movable electrode; a first bushing conductor connected to one of the fixed electrode and the movable electrode; and a second bushing conductor connected to another of the fixed electrode and the movable electrode, in which the first T-shaped cable head has one end connected to the first bushing conductor, in which the second T-shaped cable head is connected to an end of the first T-shaped cable head, which is different from the one end of the first T-shaped cable head, in which the third T-shaped cable head has one end connected to the second bushing conductor, in which the first T-shaped cable head and the second T-shaped cable head are connected to respective circuits, and in which the first T-shaped cable head, the second T-shaped cable head, the third T-shaped cable head, the switch, the first bushing conductor, and the second bushing conductor are set to a ground potential.

Further, according to one embodiment of the present invention, there is provided a vehicular system, including: a vehicle including a roof that is grounded; and the branching unit described above, which is arranged on the roof, in which the branching unit is arranged so as to be substantially parallel to the roof.

Advantageous Effects of Invention

According to the present invention, the branching unit, which can be reduced in height, and the vehicular system can be provided.

DESCRIPTION OF EMBODIMENTS

Now, with reference to the drawings, description is made of suitable embodiments for carrying out the present invention. Note that, the following embodiments are merely examples, and the contents of the present invention are not limited to the following specific modes. As a matter of course, the present invention can be modified to various modes including the following modes.

First Embodiment

Description is made of a first embodiment of the present invention with reference to FIG. 1 to FIG. 6.

Figure 1:
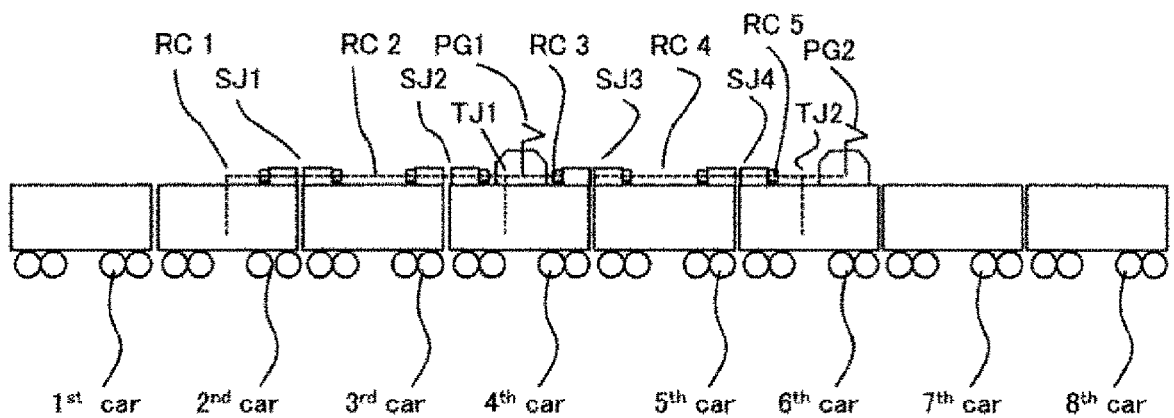
FIG. 1 is a view for illustrating an example of a railroad vehicle formation in a first embodiment of the present invention.

First, FIG. 1 is an illustration of an example of a vehicle formation of a railroad vehicle in the first embodiment of the present invention. As illustrated in FIG. 1, a railroad vehicle 100 in the first embodiment is eight cars long including cars indicated by the symbols "1stCar", "2ndCar", "3rdCar", "4thCar", "5thCar", "6thCar", "7thCar", and "8thCar".

High-voltage drawing-in cables RC1, RC2, RC3, RC4, and RC5 are arranged on a roof of the vehicle. Those cables are connected to each other at portions between the cars with straight joints SJ1, SJ2, SJ3, and SJ4 and branched at T-shaped branching joints TJ1 and TJ2 in a downward direction toward a vehicle floor. As described later in FIG. 3, the T-shaped branching joint TJ1 and the straight joint SJ2 are integrally formed (70V). Further, the T-shaped branching joint TJ2 and the straight joint SJ4 are integrally formed (70W). Meanwhile, the high-voltage drawing-in cables RC3 and RC5 are connected to pantographs PG1 and PG2, respectively, and receive electric power from a feeder line (not shown).

Figure 2:
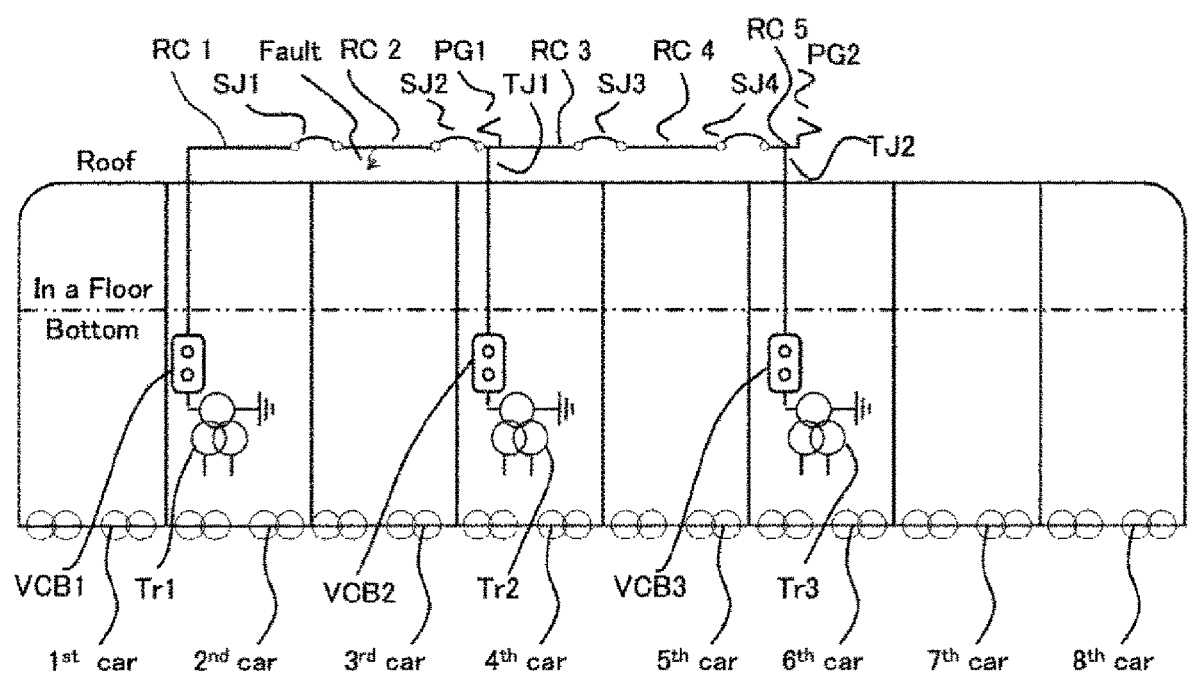
FIG. 2 is a feeder circuit diagram of the railroad vehicle formation in the first embodiment.

FIG. 2 is an illustration of an electric circuit. The high-voltage drawing-in cable RC1 is directly connected to a primary side of a power-receiving VCB1 provided under the floor. A main transformer Tr1 is connected to a secondary side of the power-receiving vacuum circuit breaker VCB1. A secondary winding wire of the main transformer Tr1 is connected to an electric motor, and tertiary winding wires of the main transformer Tr1 supply electric power to auxiliary devices. Similarly, the high-voltage drawing-in cable branched from the T-shaped branching unit TJ1 is connected to a primary side of a power-receiving vacuum circuit breaker VCB2 provided under the floor. A main transformer Tr2 is connected to a secondary side of the power-receiving VCB2. A secondary winding wire of the main transformer Tr2 is connected to an electric motor, and tertiary winding wires of the main transformer Tr2 supply electric power to auxiliary devices. Similarly, the high-voltage drawing-in cable branched from the T-shaped branching unit TJ2 is connected to a primary side of a power-receiving vacuum circuit breaker VCB3 provided under the floor. A main transformer Tr3 is connected to a secondary side of the power-receiving VCB3. A secondary winding wire of the main transformer Tr3 is connected to an electric motor, and tertiary winding wires of the main transformer Tr3 supply electric power to auxiliary devices. As illustrated in FIG. 2, the power-receiving vacuum circuit breakers VCB1, VCB2, and VCB3 and the main transformers Tr1, Tr2, and Tr3 are arranged under the floor, and the electric components (RC, SJ, PG and TJ) illustrated in FIG. 2 other than the above-mentioned components are arranged on the roof. It is inconvenient for a worker to go up onto the roof. Thus, it is preferred that work be completed without going up onto the roof as far as possible. Further, when the components are arranged on the roof, a space on the roof of the vehicle, particularly a space in a height direction is largely limited. Accordingly, it is desired that also the electric components be reduced in height.

In the circuit, when a ground fault occurs at a position indicated by the symbol "Fault", the straight joint SJ2 is automatically opened by a command from the outside. Accordingly, only the main transformer Tr1 is disconnected, thereby being capable of continuing operation. Specifically, a movable electrode 5 in a unit switch 70U described below is operated. In the first embodiment, description is made of an example in which the ground fault occurs at the position indicated by the symbol "Fault", and only the straight joint SJ2 performs disconnection of the circuit so as to suppress a further influence of the fault. Needless to say, the straight joint to perform the disconnection is changed in accordance with a location of a ground fault. With this structure, a high-voltage cable including a fault part and a normal high-voltage cable can automatically be disconnected from each other without requiring a worker to go up onto the roof of the vehicle.

Figure 3:
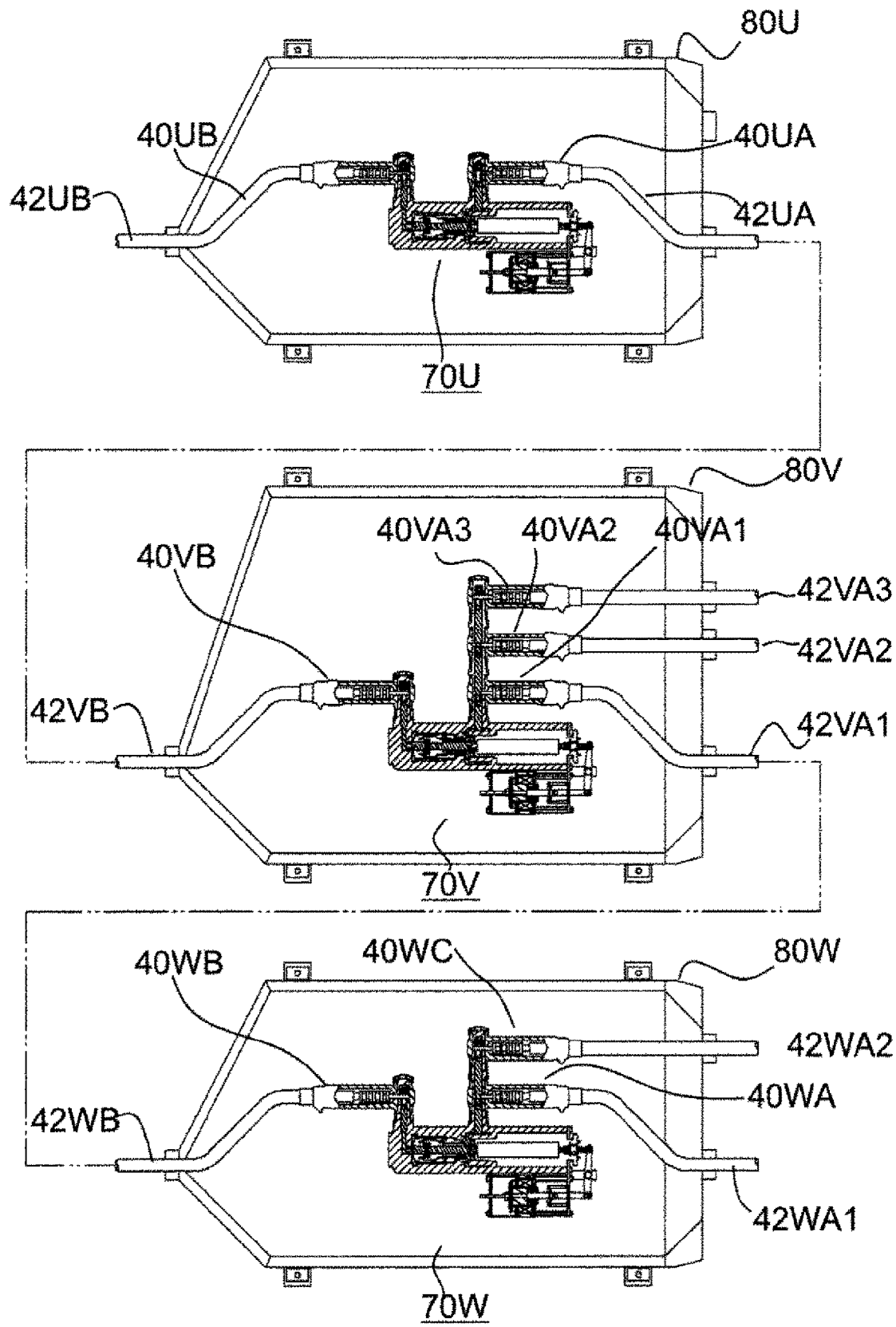
FIG. 3 is a plan connection view for illustrating an arrangement state of switches in the first embodiment.

FIG. 3 is an illustration of specific configurations of the switches. Particularly, the unit switches 70U, 70V, and 70W in FIG. 3 are illustrated in a plan view. In the first embodiment, the T-shaped cable heads, the unit switches, and bushing conductors are arranged so as to be substantially flush with one another. Thus, the reduction in space on the roof of the vehicle in the height direction is achieved.

First, the unit switch 70U forms the straight joint SJ1 in FIG. 2. A cable head 4OUB mounted to a high-voltage cable 42UB is connected to a fixed side of the unit switch 70U. A cable head 40UA mounted to a high-voltage cable 42UA is connected to a movable side of the unit switch 70U. The switch is received in a case 80U.

Next, the unit switch 70V forms the straight joint SJ2 and the T-shaped branching unit TJ1 in FIG. 2. A cable head 40VB mounted to a high-voltage cable 42VB is connected to a fixed side of the unit switch 70V. High-voltage cables 42VA1, 42VA2, and 42VA3 are mounted to a movable side of the unit switch 70V and connected to the switch unit 70W, the power-receiving vacuum circuit breaker VCB2, and the pantograph PG1, respectively. The switch is received in a case 80V.

Further, the unit switch 70W forms the straight joint SJ4 and the T-shaped branching unit TJ2 in FIG. 2. A cable head 40WB, which is mounted to a high-voltage cable 42WB connected to the unit switch 70V side, is connected to a fixed side of the unit switch 70W. High-voltage cables 42WA1 and 42WA2 are mounted to a movable side of the unit switch 70W and connected to the power-receiving vacuum circuit breaker VCB3 and the pantograph PG2, respectively. The switch is received in a case 80W.

As described above, the straight joint and the branching joint are mounted in one car of the railroad vehicle. The straight joint and main parts of the branching joint are shared so that an assembling property and maintainability are improved. A mounting base on the railroad vehicle side can also be shared.

Figure 4:
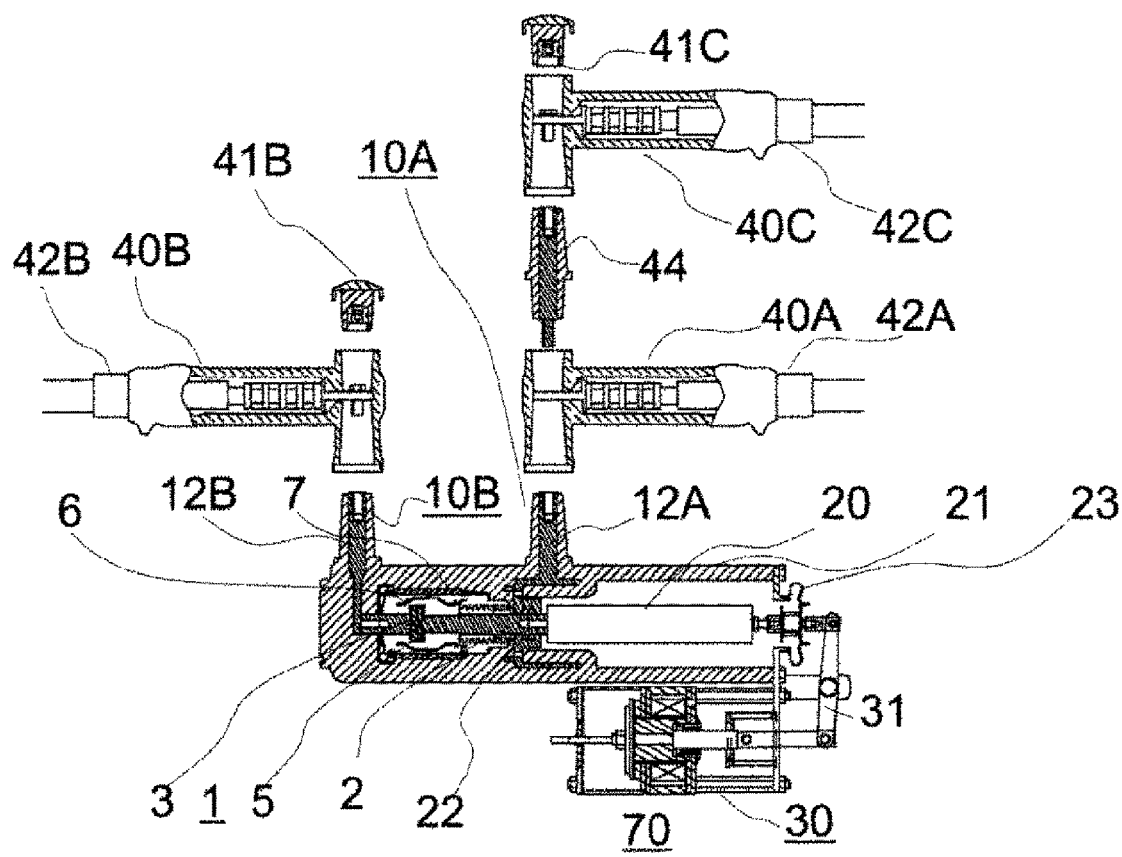
FIG. 4 is a view of components of the switch in the first embodiment.

Next, the unit switch 70 in the first embodiment is illustrated in detail in FIG. 4. The unit switch 70 includes a vacuum interrupter 1 formed of, for example, a fixed electrode 3, a movable electrode 5, an arc shield 6, a ceramic insulating cylinder 7, and a bellows 2. The movable electrode 5 is brought in contact with and separated from the fixed electrode 3. The arc shield 6 covers peripheries of the fixed electrode 3 and the movable electrode 5. The ceramic insulating cylinder 7 supports the arc shield 6 and has a cylindrical shape forming an outer container of the vacuum interrupter 1. Both ends of the ceramic insulating cylinder 7 are covered with end plates to form the outer container of the vacuum interrupter 1 so that an inside of the ceramic insulating cylinder 7 is maintained in a vacuum state. The fixed electrode 3 is connected to a fixed conductor, and the fixed conductor is drawn outside the vacuum interrupter 1. The movable electrode 5 is connected to a movable conductor, and the fixed conductor is drawn outside the vacuum interrupter 1. The above-mentioned bellows 2 is arranged between the movable conductor and the end plate on the movable side. While maintaining the vacuum interrupter 1 in a vacuum state, the bellows 2 allows the movable conductor to be movable. The unit switch 70 further includes an electric-power collecting section and an air-insulation operating rod 20. In the electric-power collecting section, the bushing conductor 12A connected to the movable conductor side and the bushing conductor 12B connected to the fixed conductor side are molded with a solid insulator 21 such as epoxy resin, and a spring contact 22 is provided to the movable side of the vacuum interrupter 1. The air-insulation operating rod 20 drives the movable electrode 5 of the vacuum interrupter 1 to be approachable to and separable from the fixed electrode 3. The solid insulator 21 covers the vacuum interrupter 1, the bushing conductor 12A, and the bushing conductor 12B in a closely contact manner, and further covers a periphery of the air-insulation operating rod 20. A space in the periphery of the air-insulation operating rod 20 is sealed by flexible members such as the solid insulator 21 a rubber bellows 23, and the space is filled with dry air or an insulation gas such as an SF6 gas. Note that, in place of the rubber bellows 23, a linear seal may be applied, or the space may be sealed by a film having moisture permeability. Alternatively, a large creepage distance for insulation of the air-insulation operating rod 20 may sufficiently be secured so that the periphery space is set to an atmospheric state without being sealed. The air-insulation operating rod 20 is connected to one end of a lever 31, and an electromagnetic operating unit 30 is connected to the other end of the lever 31. The electromagnetic operating unit 30 is arranged on the same side as the vacuum interrupter 1 with respect to the lever 31 and arrayed so as to be substantially parallel to the vacuum interrupter 1. With this arrangement, the unit switch 70 as a whole can be prevented from being elongated in a movable direction of the movable conductor. Although detailed description is omitted, for example, the electromagnetic operating unit 30 in which permanent magnets and an electromagnet are mounted to a spring in combination is configured to generate a driving force by switching, between an ON state and an OFF state, power distribution to a coil forming the electromagnet.

In this configuration, the unit switch 70 includes one electric connection portion 10B on the fixed side of the vacuum interrupter 1 and one electric connection portion 10A on the movable side of the vacuum interrupter 1. The T-shaped cable head 40A, a connection conductor 44, the T-shaped cable head 40C, and an insulating plug 41C are sequentially mounted on top of one another to the electric connection portion 10A. Meanwhile, the T-shaped cable head 40B and an insulating plug 41B are sequentially mounted one over the other to the electric connection portion 10B. For example, a solid insulator covers a periphery of a conductor to form the connection conductor 44. Those components are provided on a side opposite to the electromagnetic operating unit 30.

Figure 5:
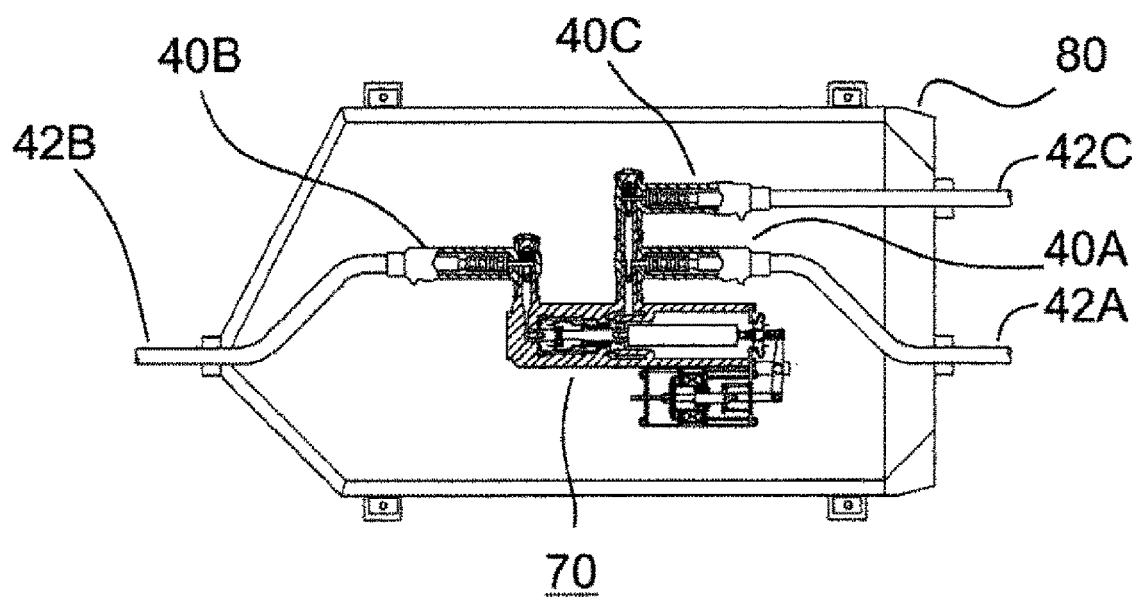
FIG. 5 is a plan view of a mounted state of the switch in the first embodiment.

Next, in FIG. 5, the branching joint is formed in the following manner. Specifically, the unit switch 70 illustrated in FIG. 4 is received in the case 80, and a cable 42A, a cable 42B, and a cable 42C are mechanically held by the case 80 so as not to apply a biased load to the electric connection portion 10A and the electric connection portion 10B. The cable 42B and the cable 42A are drawn in to a front side of the railroad vehicle (leftward in FIG. 5) and to a rear side of the railroad vehicle (rightward in FIG. 5), respectively. The cable 42C is connected to the main transformer under the floor. In the embodiment, the unit switches 70V and 70W each include one bushing on the movable side and one bushing on the fixed side, that is, two bushings in total. The branching unit can be formed by merely connecting two T-shaped cable heads to the bushing on one side. General-purpose products can be used as the T-shaped cable heads and the connection conductor 44, and hence can be obtained inexpensively.

In the unit switch described above, one bushing is connected to each of the fixed side and the movable side. One T-shaped cable head is connected to the bushing on one side, and a plurality of cable heads are connected to the bushing on the other side. Further, the plurality of connected cables are connected to respective circuits. A plurality of switches arranged so as to be flush with one another in a substantially horizontal direction are installed at positions on the high-voltage drawing-in cables on the roof of the railroad vehicle. In this manner, the T-shaped cable head and the switches are capable of electrically disconnecting the cars. Further, the high-voltage drawing-in cables are branched to be connected to the power-receiving vacuum circuit breakers installed under the floor of the vehicle.

In the first embodiment, in order to secure safety, the roof of the vehicle is grounded, and the T-shaped cable heads and surfaces of the unit switches are set to a ground potential. In view of securing safety for a worker, the roof of the vehicle is generally grounded. At the same time, there is a strict limitation on heights of the electric components to be arranged on the roof of the vehicle as described above. Regarding such limitation, according to the first embodiment, the T-shaped cable heads and the surfaces the unit switches are set to a ground potential. Thus, there is no need to secure an insulating distance between the components and the roof of the vehicle, thereby being capable of reducing the heights. More specifically, the branching units can be arranged on the roof so as to be substantially parallel to the roof.

Further, the bushing conductors 12A and 12B are arranged in a direction substantially perpendicular to the movable direction of the movable electrode 5 so that the bushing conductors 12A and 12B are prevented from increasing in size in the movable direction. In the first embodiment, the bushing conductors 12A and 12B are arranged in the direction substantially perpendicular to the movable direction of the movable electrode 5. However, as long as the bushing conductors 12A and 12B are provided at least in a direction different from the movable direction, certain effects can be expected.

Figure 7:
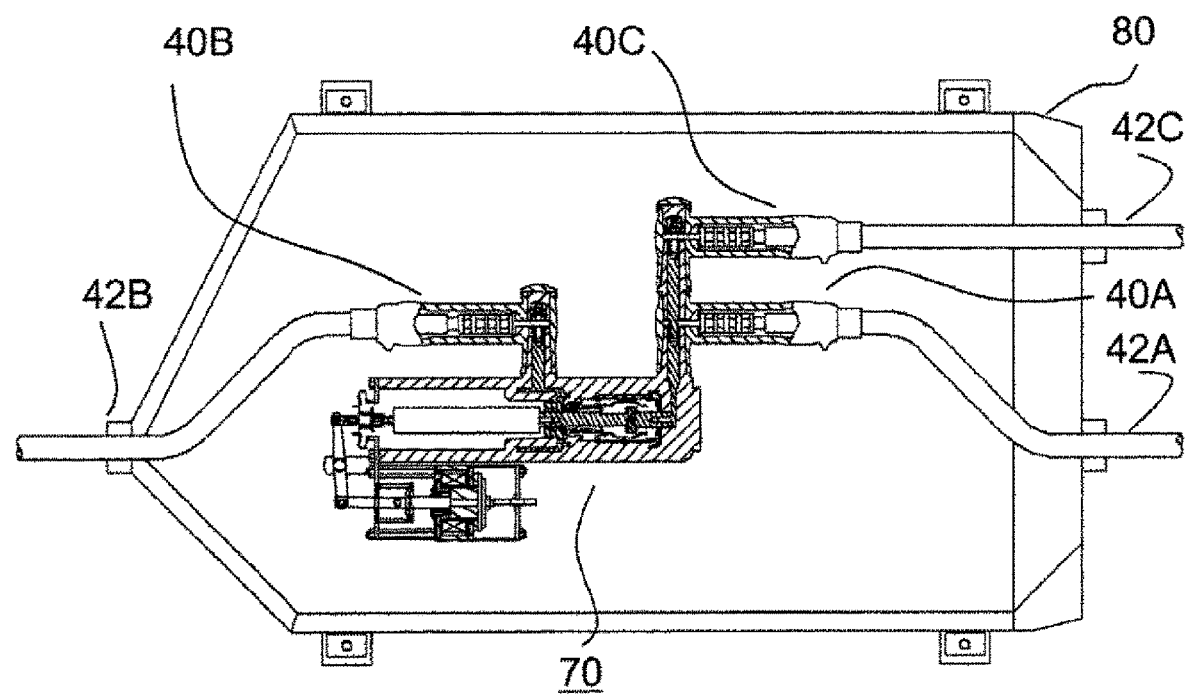
FIG. 7 is a plan view of a mounted state of a switch in a second embodiment of the present invention.

Further, as illustrated in FIG. 7, a relative position between the fixed side and the movable side of the unit switch 70 in the case 80 can be reversed. With such configuration, the similar effects described above can be obtained.

Further, through standardization of the structures of the unit switches, component management is facilitated.

Second Embodiment

Figure 6:
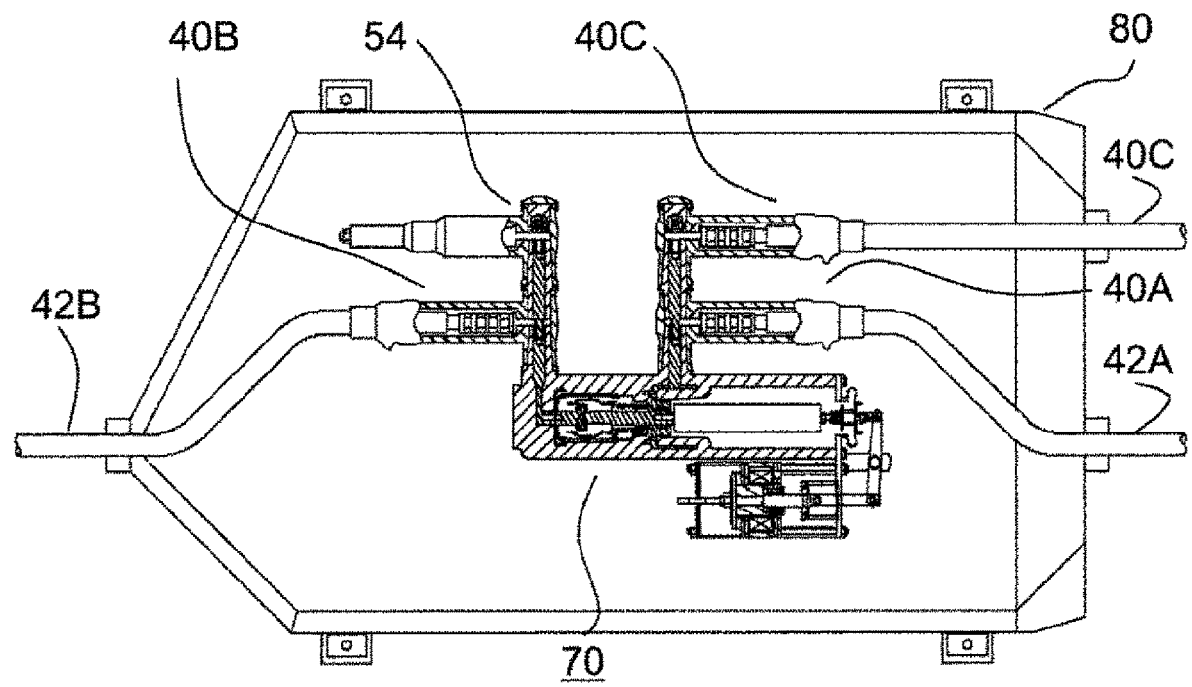
FIG. 6 is a plan view of the mounted state of the switch in the first embodiment.

Description is made of a second embodiment of the present invention with reference to FIG. 6. In the second embodiment, an arrester 54 is placed on and connected to the cable head 40B on the fixed side of the unit switch 70.

In the second embodiment, through efficient use of the space in the case 80, the arrester 54 is implemented. Accordingly, entry of an overvoltage generated by, for example, a thunderstroke can be suppressed. The arrester 54 is also arranged in a direction parallel to the movable direction of the movable electrode 5, and hence is prevented from increasing in size in the height direction. In the second embodiment, the arrester 54 is arranged in a direction substantially parallel to the movable direction of the movable electrode 5. However, as long as the arrester 54 is arranged in a substantially parallel direction, a certain effect of reducing in height can be expected.

Third Embodiment

Figure 8:
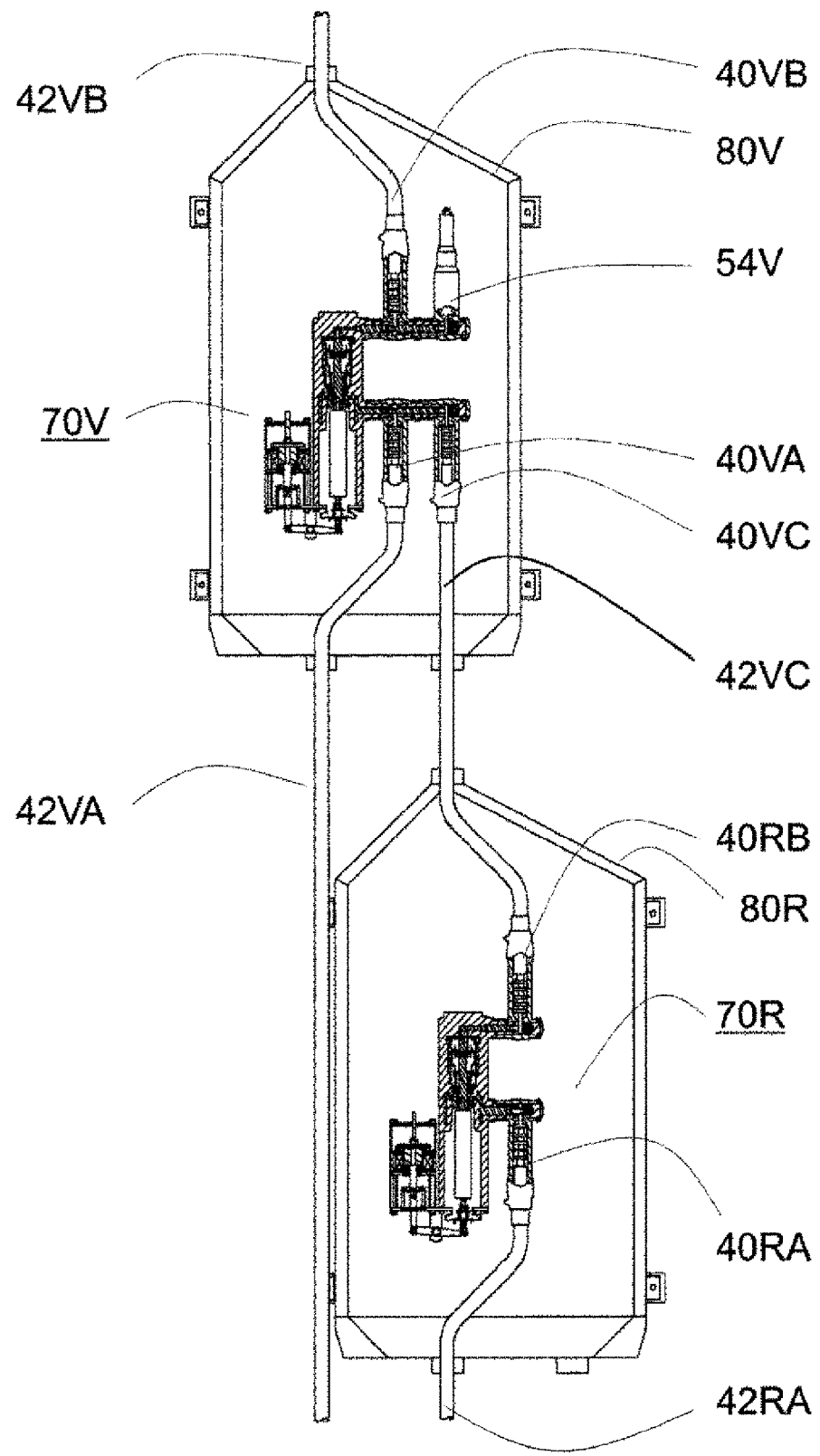
FIG. 8 is a plan connection view for illustrating a feeder circuit in a third embodiment of the present invention.

Description is made of a third embodiment of the present invention with reference to FIG. 8. In the third embodiment, there is illustrated a feeder circuit in which the branching joint in the first embodiment or the second embodiment and the straight joint are connected in series and placed on the roof. A cable 42RA connected to the straight joint is connected to the main transformer arranged under the vehicle floor. Here, it is assumed that the switch unit 70V forming the branching joint is a breaker having no short-circuit current cutoff function and that a switch unit 70R forming the straight joint is a breaker having a short-circuit current cutoff function. In the third embodiment, the switch unit 70R functions as a breaker, and hence there is no need to arrange a breaker under the floor. As a result, a wide compartment space can be secured, and maintainability is improved.

REFERENCE SIGNS LIST

1 vacuum interrupter
2 bellows
3 fixed electrode
5 movable electrode
6 arc shield
7 ceramic insulating cylinder
10A, 10B, 10C electric connection portion
12A, 12B bushing conductor
20 air-insulation operating rod
21 solid insulator
22 spring contact
23 rubber bellows
30, 30A, 30B, 30C electromagnetic operating unit
31 lever
32 power capacitor
33 control board
34 changeover switch
40A, 40B, 40C cable head
41A, 41C insulating plug
42A, 42B, 42C cable
43 arrester
44 connection conductor
50 AC circuit
51 DC circuit
53 pantograph circuit
52 grounding circuit
53 arrester circuit
60 inter-circuit coupling bus
70 unit switch
80 case

The invention claimed is:
1. A branching unit, comprising:
a first T-shaped cable head;
a second T-shaped cable head;
a third T-shaped cable head;
a switch including a fixed electrode and a movable electrode;
a first bushing conductor connected to one of the fixed electrode and the movable electrode; and
a second bushing conductor connected to another of the fixed electrode and the movable electrode,
wherein the first T-shaped cable head has one end connected to the first bushing conductor,
wherein the second T-shaped cable head is connected to an end of the first T-shaped cable head, which is different from the one end of the first T-shaped cable head,
wherein the third T-shaped cable head has one end connected to the second bushing conductor,
wherein the first T-shaped cable head and the second T-shaped cable head are connected to respective circuits, and
wherein the first T-shaped cable head, the second T-shaped cable head, the third T-shaped cable head, and a surface of the switch are set to a ground potential.

2. A branching unit according to claim 1, wherein the first T-shaped cable head, the second T-shaped cable head, the third T-shaped cable head, and the switch are arranged so as to be substantially flush with one another.

3. A branching unit according to claim 1, wherein bushings to which the first T-shaped cable head, the second T-shaped cable head, and the third T-shaped cable head are connected are provided in a direction substantially perpendicular to a movable direction of the movable electrode.

4. A branching unit according to claim 1, further comprising an arrester connected to an end of the third T-shaped cable head, which is different from the one end of the third T-shaped cable head connected to the second bushing.

5. A vehicular system, comprising:
a vehicle including a roof that is grounded; and
the branching unit of claim 1, which is arranged on the roof,
wherein the branching unit is arranged so as to be substantially parallel to the roof.

6. A vehicular system comprising:
a vehicle including a roof that is grounded; and
the branching unit of claim 1, which is arranged on the roof, wherein the branching unit is arranged so as to be substantially parallel to the roof,
a straight joint, which is arranged on the roof and connected in series with the branching unit; and
a main transformer, which is electrically connected to the straight joint and arranged under a floor of the vehicle,
wherein the straight joint includes a breaker, and
wherein the floor is free from a breaker.

* * * * *